(12) United States Patent  
Usui

(10) Patent No.: US 8,817,727 B2  
(45) Date of Patent: Aug. 26, 2014

(54) ON-BOARD WIRELESS COMMUNICATION APPARATUS AND ON-BOARD WIRELESS COMMUNICATION SYSTEM

(75) Inventor: Tsutomu Usui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 13/388,641

(22) PCT Filed: Oct. 13, 2009

(86) PCT No.: PCT/JP2009/005318  
§ 371 (c)(1),  
(2), (4) Date: Feb. 2, 2012

(87) PCT Pub. No.: WO2011/045828  
PCT Pub. Date: Apr. 21, 2011

(65) Prior Publication Data  
US 2012/0127947 A1 May 24, 2012

(51) Int. Cl.  
H04W 4/00 (2009.01)  
H04W 4/02 (2009.01)  
H04W 64/00 (2009.01)

(52) U.S. Cl.  
CPC .............. H04W 4/02 (2013.01); H04W 64/006 (2013.01)  
USPC ........................................................ 370/329

(58) Field of Classification Search  
USPC ........................................................ 370/329  
See application file for complete search history.

(56) References Cited

U.S. PATENT DOCUMENTS

| | | | |
|---|---|---|---|
| 7,088,683 B2 * | 8/2006 | Sawada et al. | 370/252 |
| 7,953,064 B2 * | 5/2011 | Ahluwalia | 370/349 |
| 2006/0128370 A1 * | 6/2006 | Tahara | 455/420 |
| 2009/0170556 A1 | 7/2009 | Yamasaki et al. | |

FOREIGN PATENT DOCUMENTS

| | | |
|---|---|---|
| DE | 2003-298507 A | 10/2003 |
| EP | 1631112 A1 * | 3/2006 |
| JP | 11-225365 A | 8/1999 |
| JP | 2003-219468 A | 7/2003 |
| JP | 2004-135180 A | 4/2004 |
| JP | 2004-247924 A | 9/2004 |
| JP | 2007-089066 A | 4/2007 |
| JP | 2008-199381 A | 8/2008 |
| JP | 2009-159467 A | 7/2009 |
| WO | WO 2008/066078 A1 | 6/2008 |

OTHER PUBLICATIONS

Tauchi Nobutaka, JP2002103519, Mobile Wireless Terminal, english machine translation , entire document, Oct. 17, 2003.*

* cited by examiner

Primary Examiner — Mark Rinehart  
Assistant Examiner — Maharishi Khirodhar  
(74) Attorney, Agent, or Firm — Birch, Stewart, Kolasch & Birch, LLP

(57) ABSTRACT

An on-board wireless communication apparatus using an OFDMA scheme includes: a position information acquisition unit which estimates a position after a predetermined time period based on base station position information, mobile station position information, and speed information of mobile station as estimated mobile station position information; a transmission path information storage unit which determines a transmission rate to be applied based on the estimated position information and a distribution of the transmission rate determined by a distance from the base station; a reception buffer unit which stores received data; a reception buffer amount adjustment unit which determines a data amount to be received based on a data storage amount from the buffer unit and a type of the data therein; and a band allocation unit which determines a band requested to the base station by the transmission rate from the storage unit and the data amount from the adjustment unit.

14 Claims, 7 Drawing Sheets

(a)

(b)

(A) Map Information
Buffer Amount : Small, Decreasing (B) Music Information
Buffer Amount : Large, Decreasing Stored Data Reception Buffer □ :a  QPSK, R=3/4
⊞ :a'  16QAM, R=1/2
▦ :a"  QPSK, R=1/2
≡ :b  QPSK, R=3/4
▨ :b'  16QAM, R=1/2

- Big City, $0 \leq v \leq 30 km/h$

| Distance to Base Station | Modulation Method | Coding Rate |
|---|---|---|
| 0~100m | QPSK | R = 3/4 |
| 100~300m | 64QAM | R = 1/2 |
| ⋮ | ⋮ | ⋮ |

ON-BOARD WIRELESS COMMUNICATION APPARATUS AND ON-BOARD WIRELESS COMMUNICATION SYSTEM

TECHNICAL FIELD

The present invention relates to an on-board wireless communication apparatus which is mounted on, for example, a vehicle to perform wireless communication with the outside, and an on-board wireless communication system.

BACKGROUND ART

The state of a transmission path in wireless communication performed in an on-board wireless communication apparatus momentarily fluctuates, and the fluctuation becomes further noticeable as the on-board wireless communication apparatus moves. Patent Document 1 discloses a portable communication terminal apparatus capable of reducing power consumption while reducing the consumption of a communication resource even when the state of the transmission path is unstable. In the portable communication terminal apparatus, as an acceleration or moving speed thereof is increased, a packet error rate is increased, so that the packet error becomes likely to occur, and thus an object of the apparatus is to avoid the packet error by changing a transmission rate and avoid/reduce unnecessary consumption of the communication resource by retransmission; it is schemed that a packet length is changed in accordance with the acceleration or moving speed.

PRIOR ART DOCUMENTS

Patent Documents

Patent Document 1: Japanese Patent Application Laid-open No. 2007-089066

SUMMARY OF THE INVENTION

As mentioned above, in the wireless communication, although the packet error rate can be reduced when the packet length is shortened, the transmission quality is not necessarily degraded when the acceleration or moving speed is increased. For example, when the apparatus goes near to a communication target such as a base station, reception power is increased, so that the transmission quality may be enhanced. In the portable communication terminal apparatus disclosed in Patent Document 1, since the packet length is shortened even in such a situation, an overhead due to an increase in the number of times of the packet transmission is increased; consequently, there is a problem such that the system throughput is lowered.

In addition, in the portable communication terminal apparatus disclosed in Patent Document 1, since a data reception request on the reception side is not taken into consideration, the transmission is not performed even when data transmission can be performed without an error by allocating a robust and low transmission rate to the transmission path, and thus, there are cases where stored data in a reception buffer is exhausted.

The present invention is made to solve the above-described problem, and an object of the invention is to provide an on-board wireless communication apparatus and an on-board wireless communication system capable of improving the system throughput and reducing the capacity of the reception buffer.

The on-board wireless communication apparatus according to the invention is an on-board wireless communication apparatus for performing wireless communication using an OFDMA scheme, including: a position information acquisition unit which estimates a position after a predetermined time period based on base station position information indicating a position of a base station, mobile station position information indicating a present position of the mobile station, and speed information indicating a moving speed of the mobile station, and outputs the estimated position as estimated mobile station position information; a transmission path information storage unit which determines a transmission rate to be applied based on the estimated mobile station position information from the position information acquisition unit and a distribution of the transmission rate determined by a distance from the base station; a reception buffer unit which stores received data, a reception buffer amount adjustment unit which determines a data amount which needs to be received on the basis of a data storage amount sent from the reception buffer unit and a type of the data stored in the reception buffer unit; and a band allocation unit which determines a band to be requested to the base station based on the transmission rate sent from the transmission path information storage unit and the data amount sent from the reception buffer amount adjustment unit.

According to the on-board wireless communication apparatus according to the invention, since the on-board wireless communication apparatus is configured such that the request for the appropriate transmission rate and bandwidth is notified to the base station, the minimum band for each data type can be secured to enhance the system throughput. In addition, since the data storage amount in the reception buffer unit can be stably retained, the capacity of the reception buffer to be prepared can be reduced.

BEST MODE FOR CARRYING OUT THE INVENTION

In the following, embodiments of the present invention will be described in detail with reference to the appended drawings.

Embodiment 1

Figure 1:
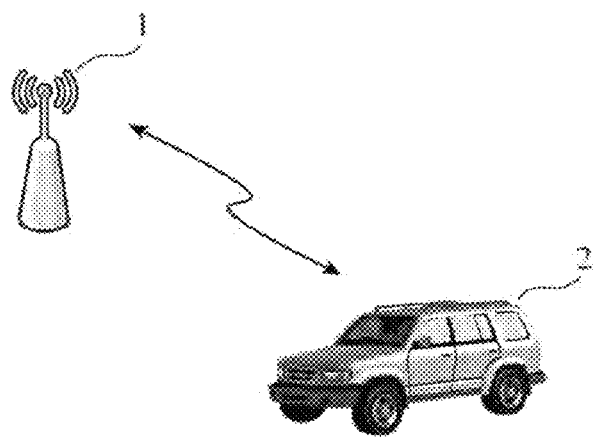
FIG. 1 is a view showing a configuration of an on-board wireless communication system using an on-board wireless communication apparatus of Embodiment 1 in the present invention.

FIG. 1 is a view showing a configuration of an on-board wireless communication system using an on-board wireless communication apparatus of Embodiment 1 in the invention. The on-board wireless communication system has a base station (BS) 1 and a mobile station (MS) 2 including the on-board wireless communication apparatus, and wireless communication using an OFDMA (Orthogonal Frequency Division Multiple Access) scheme is performed between the two stations. The OFDMA scheme is a multiplexing one in which a sub-channel composed of the combination of a logic channel of a frequency axis resulting from division of a sub-carrier and a time slot is allocated to each user.

Figure 2:
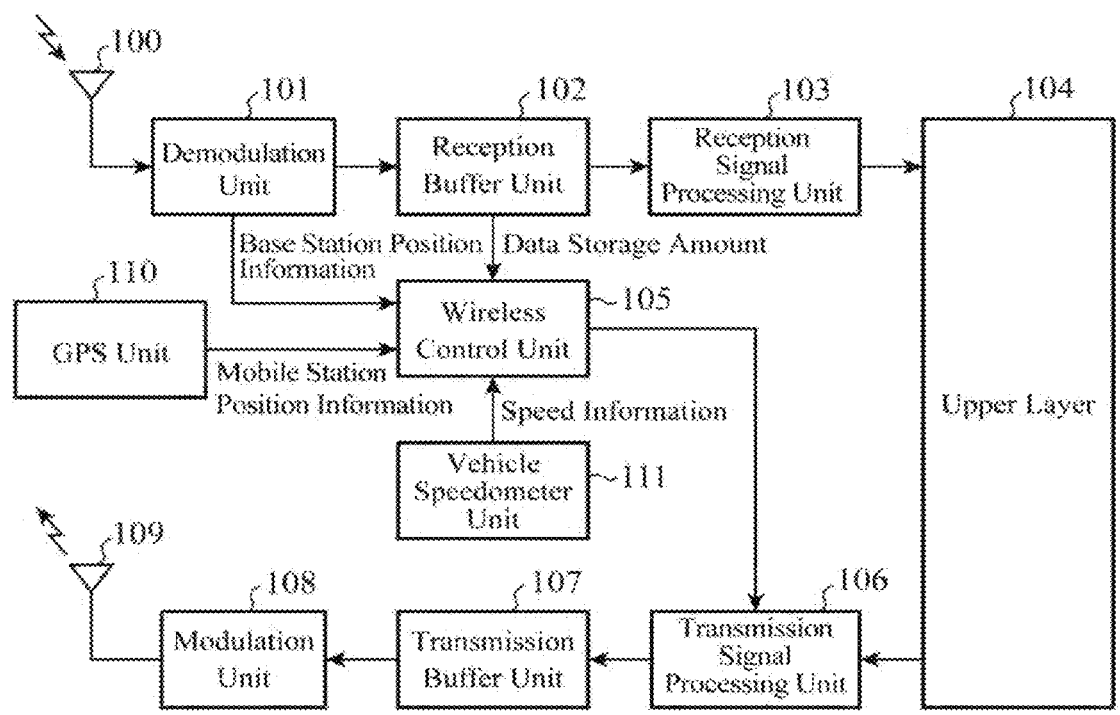
FIG. 2 is a block diagram showing the whole configuration of a mobile station used in the on-board wireless communication system using the on-board wireless communication apparatus of Embodiment 1 in the invention.

FIG. 2 is a block diagram showing the whole configuration of the mobile station 2. The mobile station 2 is constructed as, for example, a part of a navigation apparatus for implementing navigation functions, and includes a reception antenna 100, a demodulation unit 101, a reception buffer unit 102, a reception signal processing unit 103, an upper layer 104, a wireless control unit 105, a transmission signal processing unit 106, a transmission buffer unit 107, a modulation unit 108, a transmission antenna 109, a GPS (Global Positioning System) unit 110, and a vehicle speedometer unit 111.

The reception antenna 100 receives a radio wave from the air to be converted into an electric signal to be sent to the demodulation unit 101 as a reception signal. The demodulation unit 101 demodulates the reception signal sent from the reception antenna 100, and sends the resultant to the reception buffer unit 102 and the wireless control unit 105 as data.

The reception buffer unit 102 stores the data sent from the demodulation unit 101. The data stored in the reception buffer unit 102 is sent to the reception signal processing unit 103. In addition, the reception buffer unit 102 sends the amount of the stored data (hereinafter referred to as "data storage amount") to the wireless control unit 105.

The reception signal processing unit 103 converts the format of the data sent from the reception buffer unit 102 into the format for the transfer to the upper layer 104, and sends the data to the upper layer 104. The upper layer 104 executes a processing on an upper level to the data sent from the reception signal processing unit 103. In addition, the upper layer 104 sends the data subjected to the processing on the upper level to the transmission signal processing unit 106.

The wireless control unit 105 determines a transmission rate and a bandwidth of the data in accordance with a transmission path situation fluctuation prediction, the type of data to be transmitted, and a reception buffer amount, and sends the resultants to the transmission signal processing unit 106. The details of the wireless control unit 105 will be described later.

The transmission signal processing unit 106 converts the format of the data representing the transmission rate and the bandwidth sent from the wireless control unit 105, or the data from the upper layer 104 into the format for transmission to the base station 1, and sends the data to the transmission buffer unit 107. The transmission buffer unit 107 stores the data sent from the transmission signal processing unit 106. The data stored in the transmission buffer unit 107 is sent to the modulation unit 108.

The modulation unit 108 modulates the data sent from the transmission buffer unit 107, and sends the resultant to the transmission antenna 109 as a transmission signal. The transmission antenna 109 converts the transmission signal sent from the modulation unit 108 into the radio wave, and releases the radio wave into the air.

The GPS unit 110 receives a GPS signal sent from a GPS satellite to acquire position information indicating its own present position, and sends the position information to the wireless control unit 105 as mobile station position information. The vehicle speedometer unit 111 measures a vehicle speed, that is, its own moving speed, and sends the resultant to the wireless control unit 105 as speed information.

Figure 3:
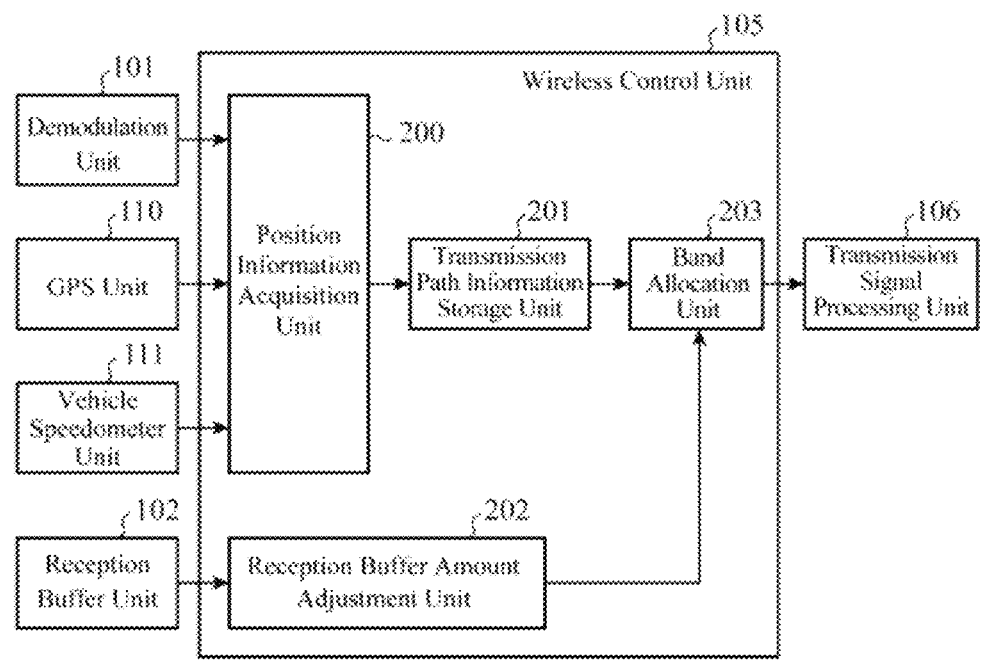
FIG. 3 is a block diagram showing a detailed configuration of a wireless control unit of the on-board wireless communication apparatus of Embodiment 1 in the invention.

Next, the details of the wireless control unit 105 will be described. FIG. 3 is a block diagram showing a detailed configuration of the wireless control unit 105. The wireless control unit 105 includes a position information acquisition unit 200, a transmission path information storage unit 201, a reception buffer amount adjustment unit 202, and a band allocation unit 203.

The position information acquisition unit 200 estimates the position of the mobile station 2 upon reception of the next frame based on base station position information included in the data sent from the demodulation unit 101, the mobile station position information sent from the GPS unit 110, and the speed information sent from the vehicle speedometer unit 111, and sends the resultant to the transmission path information storage unit 201 as estimated mobile station position information. In addition, the position information acquisition unit 200 sends the speed information sent from the vehicle speedometer unit 111 to the transmission path information storage unit 201.

The transmission path information storage unit 201 determines the transmission rate to be requested to the base station 1 based on the estimated mobile station position information sent from the position information acquisition unit 200, and a pre-stored distribution chart (the details thereof will be described later) indicating the distribution of the transmission rate in correspondence to the positional relationship between the mobile station 2 and the base station 1, and sends the resultant to the band allocation unit 203.

The reception buffer amount adjustment unit 202 determines a data amount which needs to be received based on the data storage amount sent from the reception buffer unit 102, a decrease/increase rate of the data storage amount, and the type of the stored data, and sends the resultant to the band allocation unit 203.

The band allocation unit 203 determines the band to be requested to the base station 1 based on the transmission rate sent from the transmission path information storage unit 201 and the data amount sent from the reception buffer amount adjustment unit 202, and sends the resultant to the transmission signal processing unit 106.

Next, the operation of the thus-configured on-board wireless communication apparatus of Embodiment 1 in the invention will be described by focusing on the operations of individual components of the wireless control unit 105.

Figure 4:
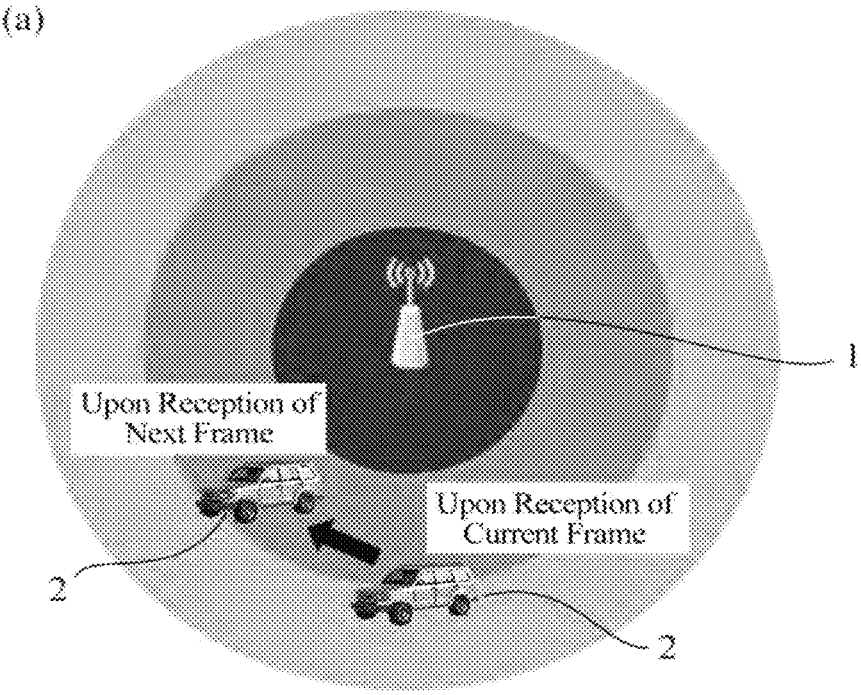
FIG. 4 is a view for explaining an operation of a position information acquisition unit of the on-board wireless communication apparatus of Embodiment 1 in the invention.
Figure 4:
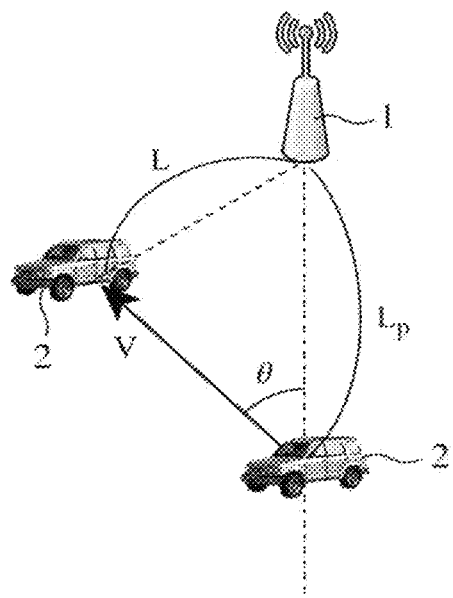

First, the operation of the position information acquisition unit 200 will be described with reference to FIG. 4. FIG. 4(*a*) is a view showing the applicable maximum transmission rate by the position of the mobile station 2 relative to the base station 1, and illustrating that a high-speed rate, a medium-speed rate, and a low-speed rate are applicable in order of increasing distance from the base station 1. Upon reception of the next frame, the transmission path environment is changed with the movement of a vehicle (mobile station 2), and thus it is necessary to apply the maximum transmission rate at the position upon reception of the next frame. For this reason, the position information acquisition unit 200 estimates the position of the mobile station 2 (distance from the base station 1) upon reception of the next frame in the following manner, and sends the resultant to the transmission path information storage unit 201 as the estimated mobile station position information.

That is, as shown in FIG. 4(*b*), when the vehicle (mobile station 2) is moving at a moving speed v [m/s] at the position a distance Lp away from the base station 1 in a direction of an angle θ [deg] relative to the direction of the base station 1, a distance L thereof from the base station 1 upon reception of the next frame (t [sec] later) can be estimated by the following expression:

$$L = (Lp - vt \cos \theta)/\sin(\tan-1((Lp - vt \cos \theta)/(vt \sin \theta))) \quad (1)$$

where Lp is calculated based on the base station position information obtained from the demodulation unit 101 and the mobile station position information obtained from the GPS unit 110, v is obtained from the vehicle speedometer unit 111, and θ is calculated based on the present mobile station position information and the previous mobile station position information obtained from the GPS unit 110, and the base station position information obtained from the demodulation unit 101.

Figure 5:
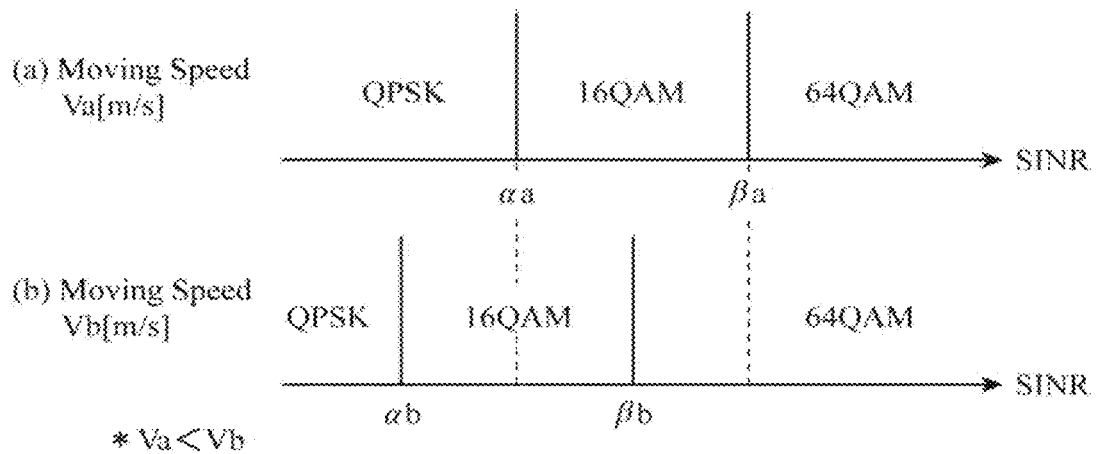
FIG. 5 is a view for explaining an operation of a transmission path information storage unit of the on-board wireless communication apparatus of Embodiment 1 in the invention.

Next, the operation of the transmission path information storage unit 201 will be described with reference to FIGS. 4 to 6. In general, under a wireless communication environment, the communication quality is changed by a distance between communication apparatuses, a surrounding situation, a movement situation, and so on. For example, as shown in FIG. 4, the applicable maximum transmission rate differs depending on the position during the communication. The maximum transmission rate (modulation method, coding rate, (time axis/frequency axis) diffusion rate, or the like) that is applicable to an allowable PER (Packet Error Rate) is determined according to RSSI (Received Signal Strength Indicator), SINR (Signal-to-Interference and Noise power Ratio), the moving speed, or the like. For example, the relation between the SINR and the maximum transmission rate as shown in FIG. 5 is established for each moving speed.

Figure 6:
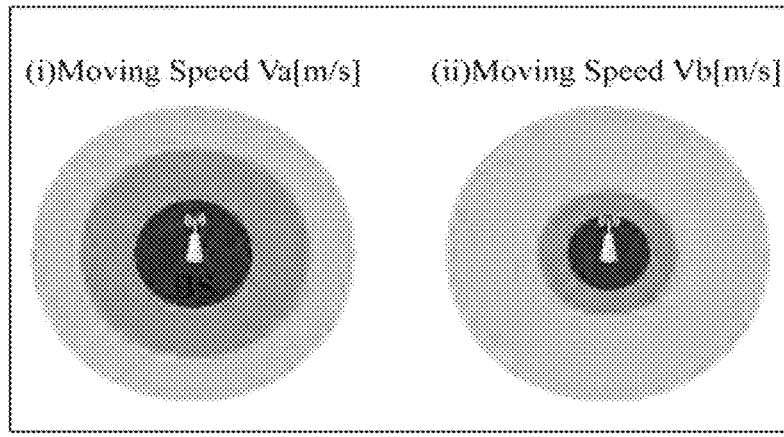
FIG. 6 is a view showing an example of a distribution chart stored in the transmission path information storage unit of the on-board wireless communication apparatus of Embodiment 1 in the invention.
Figure 6:
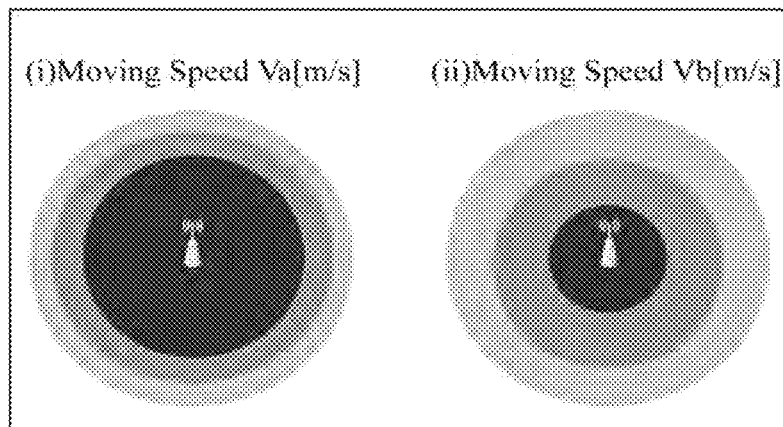
Figures 10, 11:
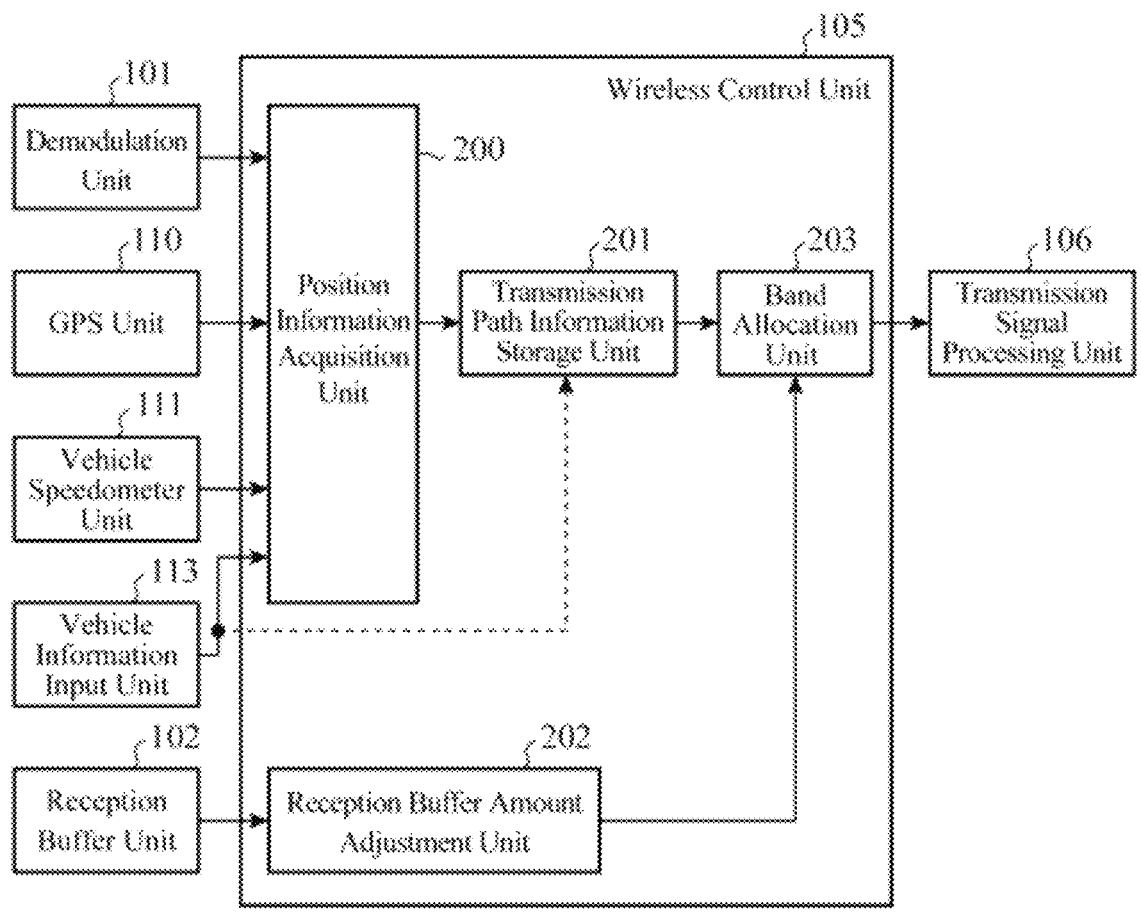
FIG. 10 is a view showing an example of a table-format distribution chart stored in the transmission path information storage unit of the on-board wireless communication apparatus of Embodiment 1 in the invention.
FIG. 11 is a block diagram showing a detailed configuration of a wireless control unit of an on-board wireless communication apparatus of Embodiment 2 in the invention.

Hereupon, since a value indicating the communication quality such as the SINR or the like is changed by the distance between communication apparatuses and surrounding circumstances, as shown in FIGS. 6(*a*) (i) and 6(*b*) (i), the distribution of a big city is different from that of countryside. Similarly, even in the same surrounding circumstances, as shown in FIGS. 6(*a*) (i) and 6(*a*) (ii), the distribution differs depending on the moving speed. The transmission path information storage unit 201 retains the distribution chart of the transmission rate as shown in FIG. 6 for the aforementioned surrounding circumstances (for example, big city, medium-size city, local city, countryside, business district, suburban residential area, Japan, USA, Europe, Asia or the like) and for each moving speed. The distribution chart of the transmission rate is retained in, for example, a table format as shown in FIG. 10. The transmission path information storage unit 201 determines the transmission rate to be applied from the estimated mobile station position information upon reception of the next frame and the speed information sent from the position information acquisition unit 200, and sends the resultant to the band allocation unit 203.

Subsequently, the operations of the reception buffer amount adjustment unit 202 and the band allocation unit 203 will be described with reference to FIGS. 7 to 9. As shown in FIG. 8, the reception buffer is prepared in the mobile station 2. When the data transmitted from the base station 1 at the transmission rate determined by the above-described method is properly received, the data is stored in the reception buffer unit 102. The data stored in the reception buffer unit 102 is sent to the reception signal processing unit 103 at a sending rate for each data type.

Hereupon, the reception buffer amount adjustment unit 202 calculates the data amount which needs to be received and a reception time limit based on the data storage amount of the reception buffer sent from the reception buffer unit 102, the decrease/increase state of the data storage amount, allowable delay of the data, and the sending rate, and sends the resultant to the band allocation unit 203.

The band allocation unit 203 determines the band to be allocated to the data communication based on the transmission rate sent from the transmission path information storage unit 201, and the required reception data amount and the reception time limit sent from the reception buffer amount adjustment unit 202.

Figure 7:
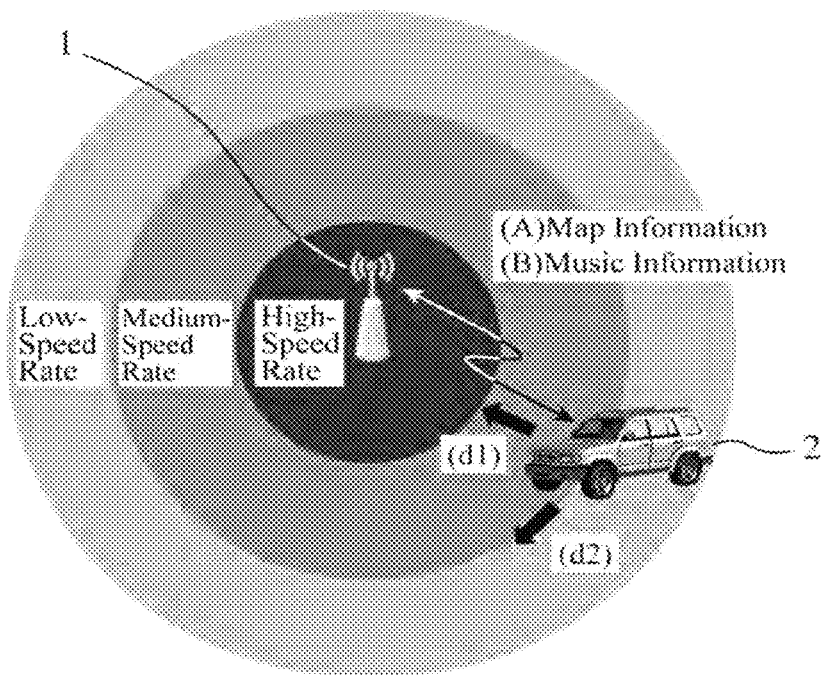
FIG. 7 is a view for explaining the operations of a reception buffer amount adjustment unit and a band allocation unit of the on-board wireless communication apparatus of Embodiment 1 in the invention.
Figure 8:
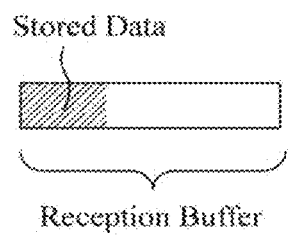
FIG. 8 is a view for explaining a reception buffer used in the on-board wireless communication apparatus of Embodiment 1 in the invention.

Now, for example, as shown in FIG. 7, the case where map information (sending rate: large, allowable delay: small) A and music information (sending rate: medium, allowable delay: large) B are simultaneously downloaded is examined. It is assumed that, at any reception timing, as indicated by a and b in FIG. 9, the map information A and the music information B are downloaded in a low-speed rate (QPSK, R=¾) region, and the data storage amount of each reception buffer is being decreased. As indicated by a direction d2 in FIG. 7, when it is predicted that a change in the transmission rate upon reception of the next frame is small, as indicated by a" in FIG. 9, the bandwidth is increased for the map information having the small data storage amount to the reception buffer and the small allowable delay, while the bandwidth is reduced for the music information having the large data storage amount to the reception buffer and the large allowable delay (no allocation in this case).

Figure 9:
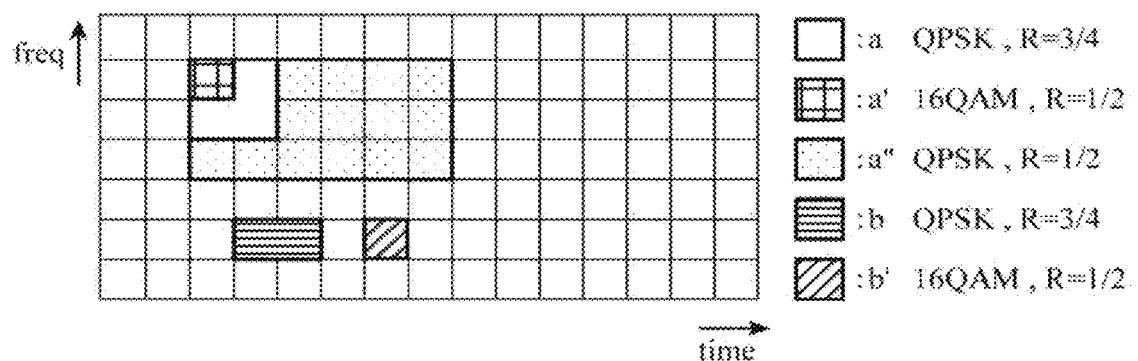
FIG. 9 is a view for explaining the operations of the reception buffer amount adjustment unit and the band allocation unit of the on-board wireless communication apparatus of Embodiment 1 in the invention.

Similarly, as indicated by d1 in FIG. 7, when it is predicted that the change in the transmission rate upon reception of the next frame is large (the transmission rate is improved in this case), as indicated by a' and b' in FIG. 9, each bandwidth is reduced. With this, the data in the reception buffer is not exhausted, so that the band can be effectively used. Note that the band allocation unit 203 sends the transmission rate and the band which are determined as described above to the transmission signal processing unit 106.

As described above, according to the on-board wireless communication apparatus of Embodiment 1 in the invention, since the apparatus is configured such that the request for the appropriate transmission rate and bandwidth is notified to the base station, the minimum band for each data type can be secured to thus enhance the system throughput. In addition, since the data storage amount of the reception buffer can be stably retained, the capacity of the reception buffer to be prepared can be reduced.

Embodiment 2

In the acquisition of the position information upon reception of the next frame by the position information acquisition unit 200 of the on-board wireless communication apparatus of Embodiment 1 discussed above, an on-board wireless communication apparatus of Embodiment 2 in the invention is configured such that the position estimation is performed by an addition of route setting information obtained by the use of a route search function of the navigation functions.

FIG. 11 is a block diagram showing a detailed configuration of the wireless control unit 105 of the on-board wireless communication apparatus of Embodiment 2. The on-board wireless communication apparatus is configured by adding a vehicle information input unit 113 to the on-board wireless communication apparatus of Embodiment 1. The vehicle information input unit 113 inputs the route setting information indicating a driving route to a destination which is calculated by the use of the route search function of the navigation functions to be sent to the position information acquisition unit 200.

The position information acquisition unit 200 estimates the position of the mobile station 2 upon reception of the next frame on the basis of the base station position information included in the data sent from the demodulation unit 101, the mobile station position information sent from the GPS unit 110, the speed information sent from the vehicle speedometer unit 111, and the route setting information inputted from the vehicle information input unit 113, and sends the resultant to the transmission path information storage unit 201 as the estimated mobile station position information. The position information acquisition unit 200 is capable of estimating the position information upon reception of the next frame (t [sec] later) based on the present position and the set driving route with the movement distance of vt [m].

As described above, according to the on-board wireless communication apparatus of Embodiment 2 in the invention, it is possible to enhance the precision of the estimated position.

Note that in the on-board wireless communication apparatus of Embodiment 2 discussed above, when the driving route is not set, the route setting information does not exist; however, the apparatus can also be configured such that a position through which the vehicle has passed is stored as driving history information, and that the driving route is predicted by the use of the stored driving history information. With this configuration, even when the route setting is not made, it is possible to enhance the precision of the estimated position upon reception of the next frame.

Embodiment 3

In the acquisition of the position information upon reception of the next frame by the position information acquisition unit 200 of the on-board wireless communication apparatus of Embodiment 1 discussed above, an on-board wireless communication apparatus of Embodiment 3 in the invention is configured such that the position estimation is performed by a further addition of traffic jam information acquired from VICS (Vehicle Information and Communication System: registered trademark, hereinafter omitted).

The configuration of the on-board wireless communication apparatus of Embodiment 3 is the same as that of the on-board wireless communication apparatus of Embodiment 2 shown in FIG. 11 except that the vehicle information input unit 113 inputs VICS information to be sent to the position information acquisition unit 200. In this case, the position information acquisition unit 200 estimates the position of the mobile station 2 upon reception of the next frame on the basis of the base station position information included in the data sent from the demodulation unit 101, the mobile station position information sent from the GPS unit 110, the speed information sent from the vehicle speedometer unit 111, and the traffic jam information from the VICS inputted from the vehicle information input unit 113, and sends the resultant to the transmission path information storage unit 201 as the estimated mobile station position information.

As described above, according to the on-board wireless communication apparatus of Embodiment 3 in the invention, it is possible to more precisely estimate the movement distance until the time of reception of the next frame; as a result, it is possible to enhance the precision of the estimated position.

Embodiment 4

In the acquisition of the position information upon reception of the next frame by the position information acquisition unit 200 of the on-board wireless communication apparatus of Embodiment 1 discussed above, an on-board wireless communication apparatus of Embodiment 4 in the invention is configured such that, the position estimation is performed by a further addition of information from a steering, a gyro, and a geomagnetic sensor.

The configuration of the on-board wireless communication apparatus of Embodiment 4 is the same as that of the on-board wireless communication apparatus of Embodiment 2 shown in FIG. 11 except that the vehicle information input unit 113 inputs at least one of steering angle information from the steering, angular velocity information from the gyro, and azimuth information from the geomagnetic sensor, and sends the information to the position information acquisition unit 200.

In this case, the position information acquisition unit 200 estimates the position of the mobile station 2 upon reception of the next frame on the basis of the base station position information included in the data sent from the demodulation unit 101, the mobile station position information sent from the GPS unit 110, the speed information sent from the vehicle speedometer unit 111, and at least one of the steering angle information from the steering, the angular velocity information from the gyro, and the azimuth information from the geomagnetic sensor which are inputted from the vehicle information input unit 113, and sends the resultant to the transmission path information storage unit 201 as the estimated mobile station position information.

As described above, according to the on-board wireless communication apparatus of Embodiment 4 in the invention, it is possible to enhance the precision of the estimation of a traveling direction (θ).

Embodiment 5

In the on-board wireless communication apparatus of Embodiment 1, though the transmission path information storage unit 201 determines the transmission rate to be applied (hereinafter referred to as "primary transmission rate") from the stored distribution chart of the transmission rate, the applicable transmission rate may be lowered due to radio wave attenuation resulting from rainfall or snowfall. For this reason, an on-board wireless communication apparatus of Embodiment 5 is configured such that the transmission rate is lowered from the primary transmission rate in accordance with the rainfall or snowfall. For example, when a rainfall or snowfall R satisfies Nα mm≤R≤(N+1)α mm, the transmission rate is lowered by N.

The configuration of the on-board wireless communication apparatus of Embodiment 5 is the same as that of the on-board wireless communication apparatus of Embodiment 2 shown in FIG. 11 except that the vehicle information input unit 113 inputs the rainfall or snowfall to be sent to the transmission path information storage unit 201 as indicated by a dotted line. In this case, the transmission path information storage unit 201 determines the transmission rate to be applied based on the estimated mobile station position information from the position information acquisition unit 200, the distribution of the transmission rate determined by the distance from the base station 1, and the rainfall or snowfall inputted from the vehicle information input unit 113.

As described above, according to the on-board wireless communication apparatus of Embodiment 5 in the invention, it is possible to perform the selection of the more appropriate transmission rate. Incidentally, the apparatus can also be configured such that the information on the rainfall is determined from the drive speed of a wiper, although the information can be obtained by a rainfall sensor.

Embodiment 6

In the on-board wireless communication apparatus of Embodiment 1, the distribution of the transmission path situation shown in FIG. 6 is retained in the transmission path information storage unit 201 of the mobile station 2; however, an on-board wireless communication apparatus of Embodiment 6 is configured such that the distribution is managed by a server, and only the distribution in a required area is downloaded from the base station 1 and used.

Figure 12:
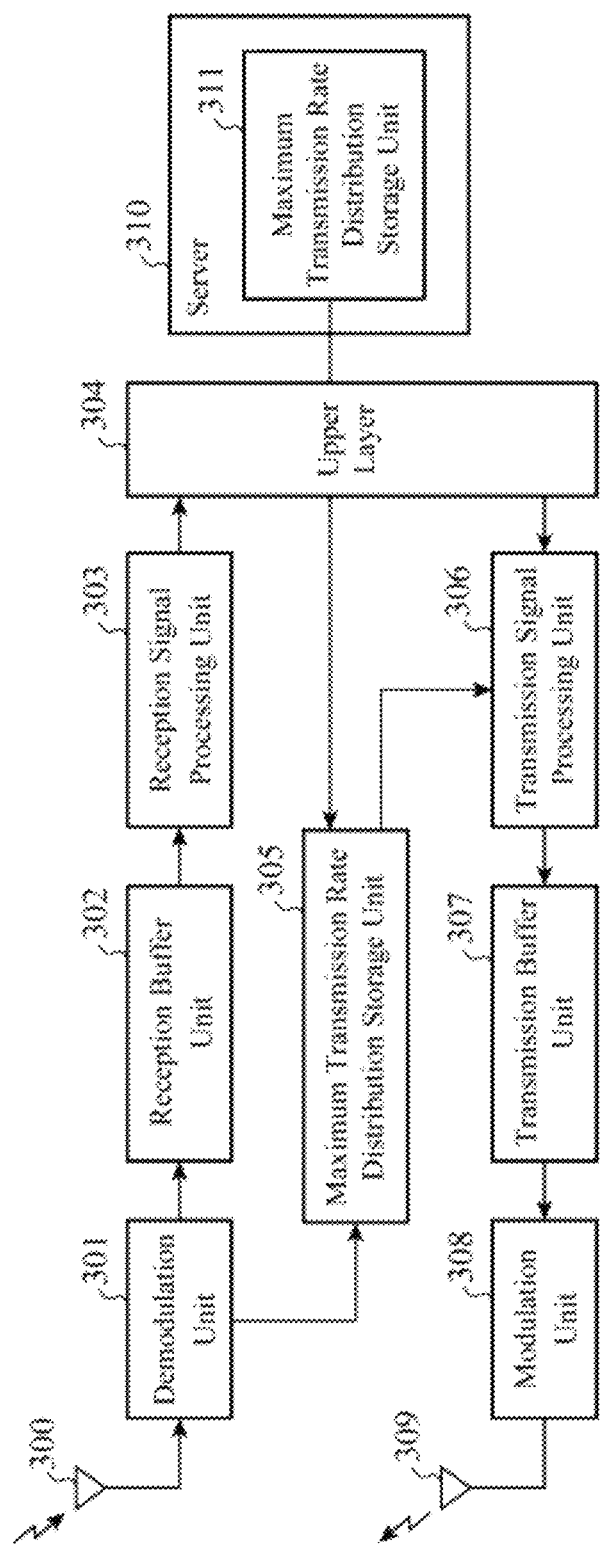
FIG. 12 is a block diagram showing the whole configuration of a base station used in an on-board wireless communication system using an on-board wireless communication apparatus of Embodiment 6 in the invention.

FIG. 12 is a block diagram showing a configuration of the base station 1. The base station 1 includes a reception antenna 300, a demodulation unit 301, a reception buffer unit 302, a reception signal processing unit 303, an upper layer 304, a maximum transmission rate distribution storage unit 305, a transmission signal processing unit 306, a transmission buffer unit 307, a modulation unit 308, and a transmission antenna 309.

The reception antenna 300 receives the radio wave from the air to be converted into the electric signal, and sends the resultant to the demodulation unit 301 as the reception signal. The demodulation unit 301 demodulates the reception signal sent from the reception antenna 300, and sends the resultant to the reception buffer unit 302 and the maximum transmission rate distribution storage unit 305 as data.

The reception buffer unit 302 stores the data sent from the demodulation unit 301. The data stored in the reception buffer unit 302 is sent to the reception signal processing unit 303. The reception signal processing unit 303 converts the format of the data sent from the reception buffer unit 302 into the format for the transfer to the upper layer 304, and sends the resultant to the upper layer 304.

The upper layer 304 executes processing on the upper level to the data sent from the reception signal processing unit 303. A server 310 is connected to the upper layer 304. In addition, the upper layer 304 sends the data subjected to the processing on the upper level to the transmission signal processing unit 306.

The maximum transmission rate distribution storage unit 305 stores a maximum transmission rate distribution chart used in the transmission path information storage unit 201 which is sent from the upper layer 304. The maximum transmission rate distribution chart stored in the maximum transmission rate distribution storage unit 305 is sent to the transmission signal processing unit 306.

The transmission signal processing unit 306 converts the format of the maximum transmission rate distribution chart that is sent from the upper layer 304 via the maximum transmission rate distribution storage unit 305 into the format for the transmission to the mobile station 2, and sends the resultant to the transmission buffer unit 307. The transmission buffer unit 307 stores the data sent from the transmission signal processing unit 306. The data stored in the transmission buffer unit 307 is sent to the modulation unit 308.

The modulation unit 308 modulates the data sent from the transmission buffer unit 307, and sends the resultant to the transmission antenna 309 as the transmission signal. The transmission antenna 309 converts the transmission signal sent from the modulation unit 308 into the radio wave, and releases the radio wave into the air.

The server 310 includes a maximum transmission rate distribution storage unit 311. The maximum transmission rate distribution storage unit 311 retains a plurality of the maximum transmission rate distribution charts. The base station 1 acquires the maximum transmission rate distribution chart of a corresponding area (for example, the big city) from the server 310 to be retained inside the station 1

On the other hand, in the on-board wireless communication apparatus, the transmission path information storage unit 201 downloads the distribution of the transmission rate from the base station 1 to be stored in the inside. The operations other than this are the same as those of the on-board wireless communication apparatus of Embodiment 1 discussed above.

Note that the on-board wireless communication apparatus of Embodiment 6 discussed above can be configured such that server information is updated by uploading the transmission path quality measured in the demodulation unit 101 and the position information of the mobile station 2 to the base station 1. According to this configuration, it is possible to reduce the memory capacity of the mobile station 2. In addition, when the latest information such as an increase in the number of buildings or opening of a new road is reflected, it becomes possible to perform the precise selection of the transmission rate, thereby enhancing the system throughput.

Further, in the on-board wireless communication apparatus of Embodiment 6 discussed above, the apparatus is configured such that the maximum transmission rate distribution chart is acquired from the server 310; however, the apparatus can also be configured such that each base station 1 retains the maximum transmission rate distribution chart only in the area covered by the base station 1. According to this configuration, the necessity managing the server is obviated, and also the selection of the transmission rate can be performed more precisely.

INDUSTRIAL APPLICABILITY

The present invention can be used in the on-board wireless communication apparatus and the on-board wireless communication system in which an improvement in system throughput and a reduction in the size of the configuration are required.

The invention claimed is:

1. An on-board wireless communication apparatus for performing wireless communication using an orthogonal frequency division multiple access (OFDMA) scheme, comprising:

a position information acquisition unit which estimates a position after a predetermined time period based on base station position information indicating a position of a base station, mobile station position information indicating a present position of the mobile station, and speed information indicating a moving speed of the mobile station, and outputs the resultant as estimated mobile station position information;
a transmission path information storage unit which determines a transmission rate to be applied based on the estimated mobile station position information from the position information acquisition unit and a distribution of the transmission rate determined by a distance from the base station;
a reception buffer unit which stores received data;
a reception buffer amount adjustment unit which determines a data amount which needs to be received on the basis of a data storage amount sent from the reception buffer unit and a type of the data stored in the reception buffer unit; and
a band allocation unit which determines a band to be requested to the base station based on the transmission rate sent from the transmission path information storage unit and the data amount sent from the reception buffer amount adjustment unit.

2. The on-board wireless communication apparatus according to claim 1, further comprising:
a vehicle information input unit which inputs route setting information indicating a route to a destination,
wherein the position information acquisition unit estimates the position after the predetermined time period on the basis of the base station position information indicating the position of the base station, the mobile station position information indicating the present position of the mobile station, the speed information indicating the moving speed of the mobile station, and the route setting information inputted from the vehicle information input unit, and outputs the resultant as the estimated mobile station position information.

3. The on-board wireless communication apparatus according to claim 1, further comprising:
a vehicle information input unit which inputs traffic jam information,
wherein the position information acquisition unit estimates the position after the predetermined time period on the basis of the base station position information indicating the position of the base station, the mobile station position information indicating the present position of the mobile station, the speed information indicating the moving speed of the mobile station, and the traffic jam information inputted from the vehicle information input unit, and outputs the resultant as the estimated mobile station position information.

4. The on-board wireless communication apparatus according to claim 1, further comprising:
a vehicle information input unit which inputs at least one of steering angle information from a steering, angular velocity information from a gyro, and azimuth information from a geomagnetic sensor,
wherein the position information acquisition unit estimates the position after the predetermined time period on the basis of the base station position information indicating the position of the base station, the mobile station position information indicating the present position of the mobile station, the speed information indicating the moving speed of the mobile station, and at least one of the steering angle information which are inputted from the vehicle information input unit, the angular velocity information from the gyro, and the azimuth information from the geomagnetic sensor, and outputs the resultant as the estimated mobile station position information.

5. The on-board wireless communication apparatus according to claim 1, further comprising:
a vehicle information input unit which inputs a rainfall or snowfall,
wherein the transmission path information storage unit determines the transmission rate to be applied based on the estimated mobile station position information from the position information acquisition unit, the distribution of the transmission rate determined by the distance from the base station, and the rainfall or snowfall inputted from the vehicle information input unit.

6. The on-board wireless communication apparatus according to claim 1, wherein the transmission path information storage unit downloads the distribution of the transmission rate from the base station.

7. An on-board wireless communication system for performing wireless communication between a base station and an on-board wireless communication apparatus using an orthogonal frequency division multiple access (OFDMA) scheme,
wherein the on-board wireless communication apparatus comprises:
a position information acquisition unit which estimates a position after a predetermined time period based on base station position information indicating a position of the base station, mobile station position information indicating a present position of the mobile station, and speed information indicating a moving speed of the mobile station, and outputs the resultant as estimated mobile station position information;
a transmission path information storage unit which determines a transmission rate to be applied based on the estimated mobile station position information from the position information acquisition unit and a distribution of the transmission rate determined by a distance from the base station;
a reception buffer unit which stores received data;
a reception buffer amount adjustment unit which determines a data amount which needs to be received on the basis of a data storage amount sent from the reception buffer unit and a type of the data stored in the reception buffer unit; and
a band allocation unit which determines a band to be requested to the base station based on the transmission rate sent from the transmission path information storage unit and the data amount sent from the reception buffer amount adjustment unit.

8. A method for performing wireless communication between a mobile station and a base station using an orthogonal frequency division multiple access (OFDMA) scheme, the method comprising:
estimating a position of the mobile station after a predetermined time period based on base station position information indicating a position of the base station, mobile station position information indicating a present position of the mobile station, and speed information indicating a moving speed of the mobile station;
determining a transmission rate to be applied based on the estimated mobile station position and a distribution of the transmission rate determined by a distance from the base station;
determining a data amount which needs to be received on the basis of an amount of data stored in a reception buffer and a type of the data stored in the reception buffer unit; and requesting a transmission band from the base station based on the determined transmission rate and the determined data amount.

9. An on-board wireless communication apparatus for performing wireless communication using an orthogonal frequency division multiple access (OFDMA) scheme, comprising:
   a reception buffer which stores received data, and
   a wireless controller that
      estimates an estimated mobile station position after a predetermined time period based on base station position information indicating a position of a base station, mobile station position information indicating a present position of the mobile station, and speed information indicating a moving speed of the mobile station;
      determines a transmission rate to be applied based on the estimated mobile station position and a distribution of the transmission rate determined by a distance from the base station;
      determines a data amount which needs to be received on the basis of a data storage amount sent from the reception buffer and a type of the data stored in the reception buffer; and
      determines a band to be requested to the base station based on the transmission rate and the data amount.

10. The on-board wireless communication apparatus according to claim 9, further comprising:
   a vehicle information input which inputs route setting information indicating a route to a destination,
   wherein the wireless controller estimates the estimated mobile station position after the predetermined time period on the basis of the base station position information indicating the position of the base station, the mobile station position information indicating the present position of the mobile station, the speed information indicating the moving speed of the mobile station, and the route setting information inputted from the vehicle information input.

11. The on-board wireless communication apparatus according to claim 9, further comprising:
   a vehicle information input which inputs traffic jam information,
   wherein the wireless controller estimates the estimated mobile station position after the predetermined time period on the basis of the base station position information indicating the position of the base station, the mobile station position information indicating the present position of the mobile station, the speed information indicating the moving speed of the mobile station, and the traffic jam information inputted from the vehicle information input.

12. The on-board wireless communication apparatus according to claim 9, further comprising:
   a vehicle information input which inputs at least one of steering angle information from a steering, angular velocity information from a gyro, and azimuth information from a geomagnetic sensor,
   wherein the wireless controller estimates the estimated mobile station position after the predetermined time period on the basis of the base station position information indicating the position of the base station, the mobile station position information indicating the present position of the mobile station, the speed information indicating the moving speed of the mobile station, and at least one of the steering angle information which are inputted from the vehicle information input, the angular velocity information from the gyro, and the azimuth information from the geomagnetic sensor.

13. The on-board wireless communication apparatus according to claim 9, further comprising:
   a vehicle information input which inputs a rainfall or snowfall,
   wherein the wireless controller determines the transmission rate to be applied based on the estimated mobile station position, the distribution of the transmission rate determined by the distance from the base station, and the rainfall or snowfall inputted from the vehicle information input.

14. The on-board wireless communication apparatus according to claim 9, wherein the wireless controller downloads the distribution of the transmission rate from the base station.

* * * * *